United States Patent [19]
Bell et al.

[11] Patent Number: 5,555,495
[45] Date of Patent: Sep. 10, 1996

[54] METHOD FOR ADAPTIVE CONTROL OF HUMAN-MACHINE SYSTEMS EMPLOYING DISTURBANCE RESPONSE

[75] Inventors: David A. Bell, Ann Arbor, Mich.; Lon E. Bell, Pasadena, Calif.; Simon Levine; Yoram Koren, both of Ann Arbor, Mich.

[73] Assignee: The Regents of the University of Michigan, Ann Arbor, Mich.

[21] Appl. No.: 142,208

[22] Filed: Oct. 25, 1993

[51] Int. Cl.$^6$ .................................................. G05B 13/02
[52] U.S. Cl. ........................ 364/148; 364/158; 364/160; 395/905; 180/907; 280/250.1; 297/DIG. 4
[58] Field of Search .................................... 364/148, 149, 364/158, 160–167.01, 176, 180, 190, 425, 424.03; 395/21, 22, 23, 61, 80, 81, 87, 88, 92, 903–905; 901/3–5; 180/907; 280/250.1, 304.1; 279/DIG. 4

[56] References Cited

U.S. PATENT DOCUMENTS

| | | | |
|---|---|---|---|
| 4,965,741 | 10/1990 | Winchell | 364/513 |
| 5,001,640 | 3/1991 | Matsumoto et al. | 364/426.02 |
| 5,006,988 | 4/1991 | Borenstein et al. | 364/424.02 |
| 5,033,000 | 7/1991 | Littlejohn et al. | 364/424.05 |
| 5,046,022 | 9/1991 | Conway et al. | 364/513 |
| 5,116,180 | 5/1992 | Fung et al. | 414/5 |
| 5,172,785 | 12/1992 | Takahashi | 180/141 |
| 5,175,795 | 12/1992 | Tsuda et al. | 395/3 |
| 5,197,114 | 3/1993 | Skeirik | 395/22 |
| 5,214,715 | 5/1993 | Carpenter | 382/15 |
| 5,247,432 | 9/1993 | Ueda | 364/162 |
| 5,272,621 | 12/1993 | Aoki | 364/165 |
| 5,278,943 | 1/1994 | Gasper et al. | 395/2 |
| 5,349,541 | 9/1994 | Alexandro, Jr. et al. | 364/578 |

OTHER PUBLICATIONS

D. W. Repperger, "The Application of a Formal Model of the Human Operator Into a System Which is Dynamically Changing," Building 33, Armstrong Laboratory AL/CFBS, Wright Patterson Air Force Base, Dayton, Ohio 45433-6573.

K. Zinser, "User Modeling and Knowledge–Based Support: On the Evaluation of Improved System Design," CH2809/0000-0024, 1989, IEEE.

H. Hakala, "Evaluation of System Components for Mobile Navigation Applications," CH2789-6/89/0000-0017, 1989, IEEE.

K. F. Kraiss et al., "Teaching Neural Networks to Guide a Vehicle Through an Obstacle Course by Emulating a Human Teacher," Research Institute for Human Engineering (FAT), Neuenahrerstr. 20, DO5307 Werthhoven, Germany.

J. Bridle et al., "Line Tracking Using an Artificial Neural Network and a Dual Process Model Bayesian Mathematical Framework".

Primary Examiner—Roy N. Envall, Jr.
Assistant Examiner—Thomas E. Brown
Attorney, Agent, or Firm—Christie, Parker & Hale, LLP

[57] ABSTRACT

Adaptive control of a system with a human in the loop is accomplished by sensing human operator reactions to a disturbance in the system and characterizing the operator response to the disturbance. The operator response is characterized in one of several forms by predicting a response based on a model quantifying a response based on statistics or merely measuring a response for accumulation of data to be employed by an artificial intelligent system. The disturbance which provides the human operator reaction, is applied or occurs naturally based on other stimulus and is measured by the system. Quantifying the results of the disturbance and the operator response comparison allows selection of a control mode by identifying one or more categories of reaction response or a graduated modification of the control law employed in the system. Various modes or categories for control of the system incorporate different sensitivities on a macro scale or an entirely different control algorithm. Graduated adaptation alters sensitivity or other perimeters in the system at a micro level incrementally throughout given ranges of control.

14 Claims, 4 Drawing Sheets

METHOD FOR ADAPTIVE CONTROL OF HUMAN-MACHINE SYSTEMS EMPLOYING DISTURBANCE RESPONSE

BACKGROUND OF THE INVENTION

1. Field of the Invention

The present invention is-drawn generally to the field of human-machine systems, wherein control of the system by a human operator is enhanced by adapting the control functions of the system to accommodate or identify changes in operator performance. More specifically, the present invention provides for measurement or application of disturbances in the control system which elicit operator response. Characterization of the response is then employed to adapt the control functions of the system for sensitivity or mode consistent with operator needs.

2. Prior Art

The present approach to "man in the loop" control of systems relies on observance of the control inputs of a human operator to either obtain a direct control response, or to provide control through a transfer function, which is characterized by previously modeled human control behavior. The second approach is obviously desirable where significant changes may occur in the control requirements for operation of the system. For example, a power steering system of an automobile may require different sensitivities depending on the speed of the automobile. Sensitive steering at slow speeds to allow maneuvering into parking spaces and other precise maneuvering requirements is desirable. However, at highway speeds on straight stretches of highway, high sensitivity could create over control or require greater operator attention than is necessary.

Various means may be employed to obtain controlled ranges or functions in the machine system based on human input. As an example, switches, knobs and other interface devices may be employed to allow the operator to directly control adaptation of the system. Automobile manual transmissions are an example of this type of adaptation. The operator directly selects the gear of the transmission to allow a specific range of operating responses from the automobile. The second type of control system may be an automated response to an unambiguous signal from the operator. The typical mechanism in automobiles which activates anti-lock braking systems for rapid stopping is initiated by a specific pressure level placed by the operator on the brake pedal consistent with a "hard stop." A second example of this type is "floor-boarding" of the accelerator to contact a microswitch to create a downshifting of an older style automatic transmission into passing gear. The third type of adaptation relies on preprogrammed sequences which monitor direct parametric results of control by the operator. An example of this type of system is an automobile automatic transmission, wherein the transmission determines the appropriate gear based on engine RPM or speed and transmission load, which is indirectly established by the operation of the accelerator pedal by the driver.

Each of these three prior art methods is appropriate under certain circumstances; however, each contains serious drawbacks. The first two methods are not autonomous and therefore are limited by attention, resources, speed, and accuracy of the human operator and can consume additional attention resources of the operator by requiring direct cognition and action. Further, the adaptation of the system is limited to a range that can be learned and performed by a human operator.

Preprogrammed sequences of adaptations do not react to changes in behavior of the human operator, relying only on a preprogrammed response to other system parameters. Certain prior art systems have attempted to model human behavior to obtain heuristic solutions to specific problems. Creating a gear change in an automatic transmission when the accelerator pedal is floor boarded by an operator is a simple example of this approach. Action by the operator to pass a vehicle results in depressing the accelerator pedal to increase speed. If additional speed is necessary, the operator presses the accelerator pedal more firmly, ultimately depressing the pedal fully to the floor thereby achieving the downshift in the transmission to a passing gear. This sequence is a natural control pattern for the operator. Similarly, tailoring of power steering systems for sensitivity based on speed employs modeling of human reactions to slow speed and high speed road conditions to create the control transfer function employed by the power steering unit at various speeds and then applying the model based only on speed of the vehicle.

Creating a truly adaptable control for a human-machine system requires knowledge of the process of human control rather than merely the result. The prior systems monitor what the operator is doing, but not how the operator is accomplishing the control. While prior art modeling techniques may employ disturbance inputs to detect operator reaction for modeling purposes, directly employing the reaction of the human operator to such disturbance in an adaptive control system has not been accomplished. It is therefore desirable to create a method and apparatus for human-machine system adaptive control which is autonomous thereby not requiring the attention of the operator, allowing use in the system when the operator is too busy to perform manual adaptation well or at all, and to provide rapid and effect adaptation over a broad range of responses.

SUMMARY OF THE INVENTION

The present invention allows characterizing of human control behavior in real time. Adaptation of control processes in the machine to reflect the current behavior of the human is then effected to provide a closed loop adaptive system. Sensing of human operator reactions to a disturbance in the system allows characterization of the operator response to the disturbance. The operator response is characterized in one of several forms, including predicting the response based on a model, quantifying the response based on statistics or merely measuring the response for accumulation of the data to be employed by an artificial intelligence system. Predicting of the operator response is accomplished using standard modeling techniques and comparison of the predicted response to the actual sensed response to the disturbance allows control output signals in the system to be directly adapted to the human control behavior.

The disturbance, to which the human operator reacts, is either applied by the system or occurs naturally based on other stimulus and is measured by the system. An applied disturbance is calculated by the system to determine a response based on current system conditions, the calculated disturbances is applied and human operator reaction is sensed. Prediction of the operator response is modeled based on the calculated disturbances applied and the actual operator reaction is compared to the predicted operator response.

The alternative embodiment providing measurement of a disturbance caused by external inputs to the system requires calculation of the prediction based on the measured disturbance followed by comparison of the actual human reaction to the disturbance with the modeled behavior.

In either case, the resulting control adaptation by the system is accomplished by quantifying the results of the comparison to allow selection of a control mode by identifying one or more categories of reaction response to the disturbances or a graduated modification of the control law employed in the system. The various modes or categories for control of the system incorporate different sensitivities on a macro scale or an entirely different control algorithm. The graduated adaptation alters sensitivity or other parameters in the system at a micro level incrementally throughout given ranges of control.

A highly simplified embodiment of the system merely prompts the human operator to perform a manual adaptation of the control system based on an indicator resulting from the predicted an actual response comparison.

Figure 1:
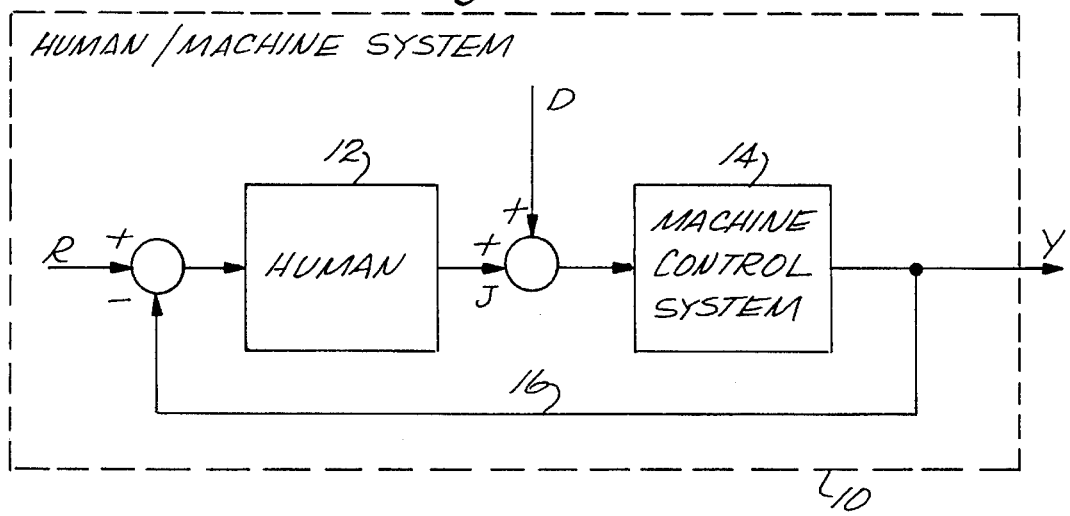
FIG. 1 is a basic block diagram showing various elements of the human-machine system.
Figure 2:
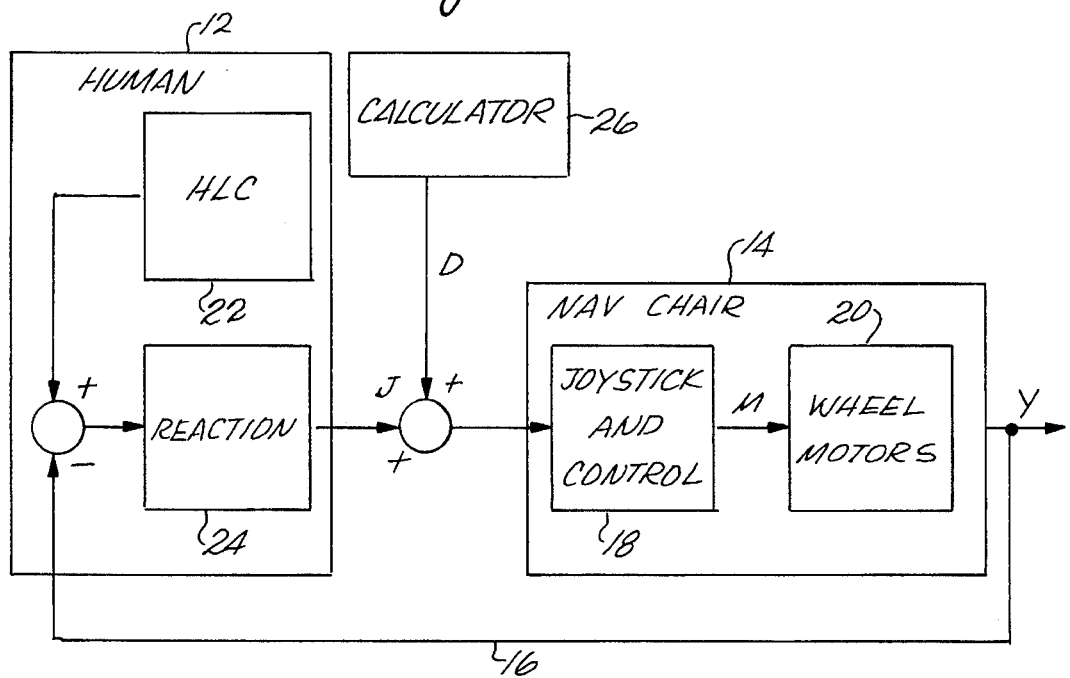
FIG. 2 is a block diagram of a first embodiment of the system employed for a motorized wheel chair application.
Figure 3:
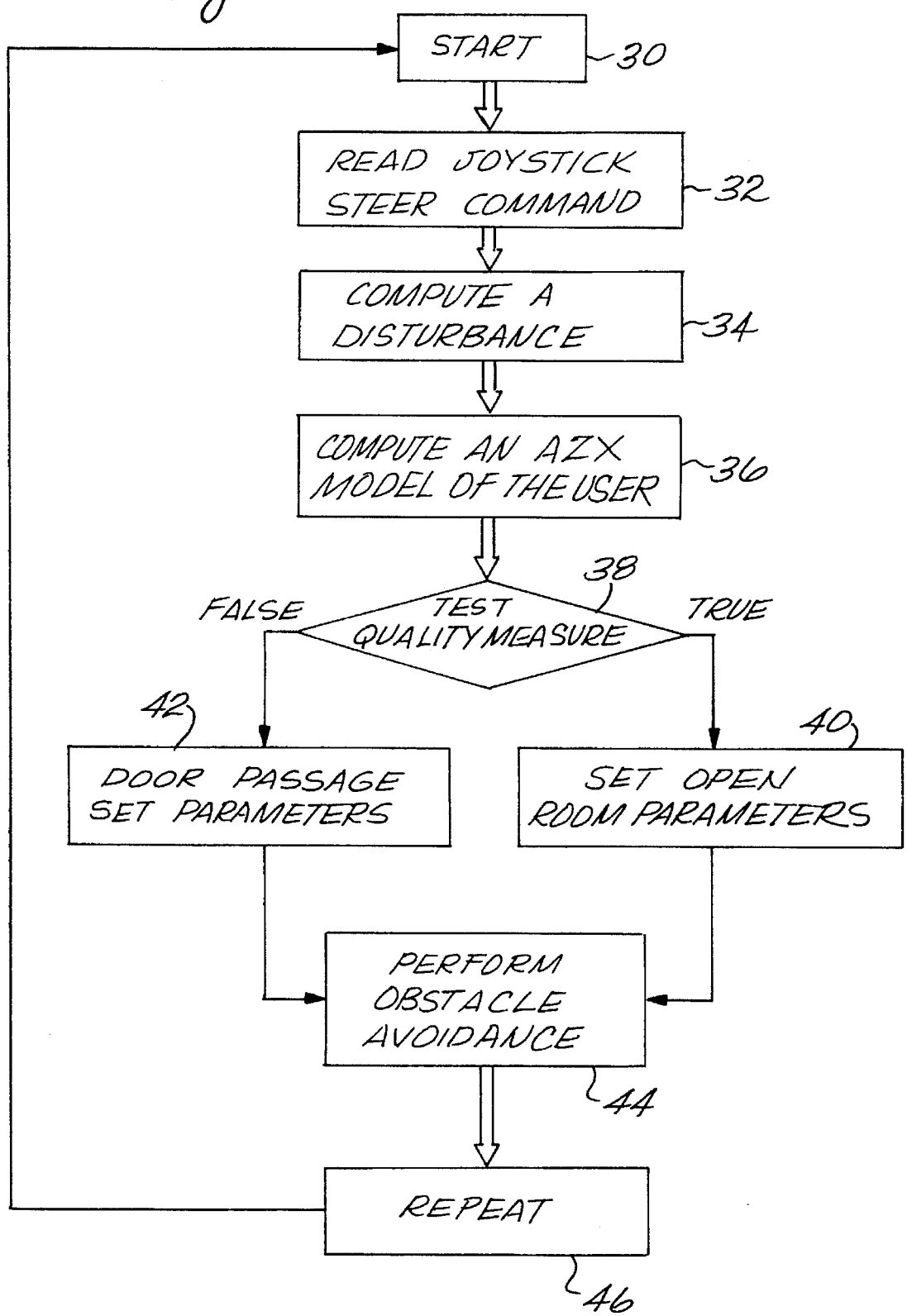
FIG. 3 is a flow chart for operation of method of the present invention in the wheelchair system.
Figure 4:
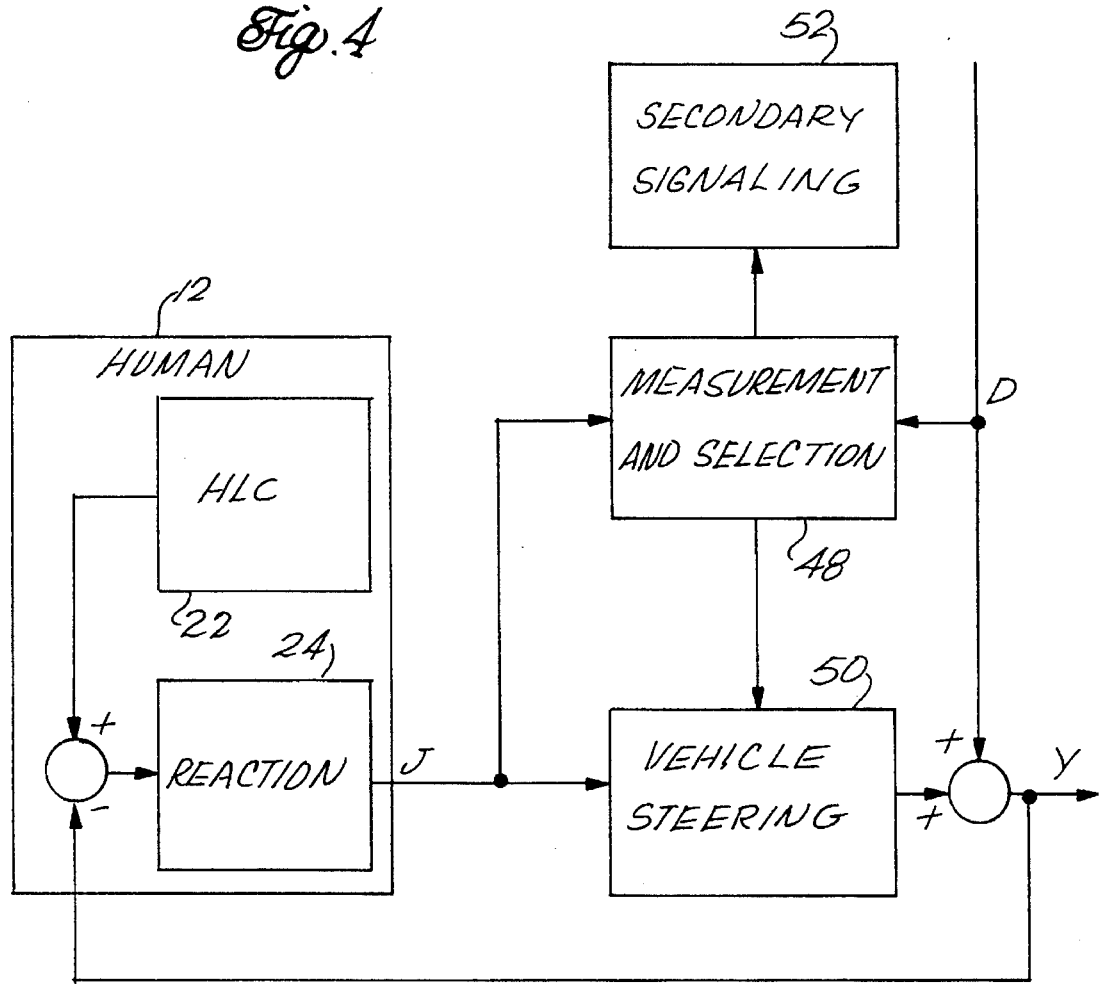
FIG. 4 is a basic diagram for a second embodiment of the invention employed in an automotive control system using the measuring disturbance approach.
Figure 5:
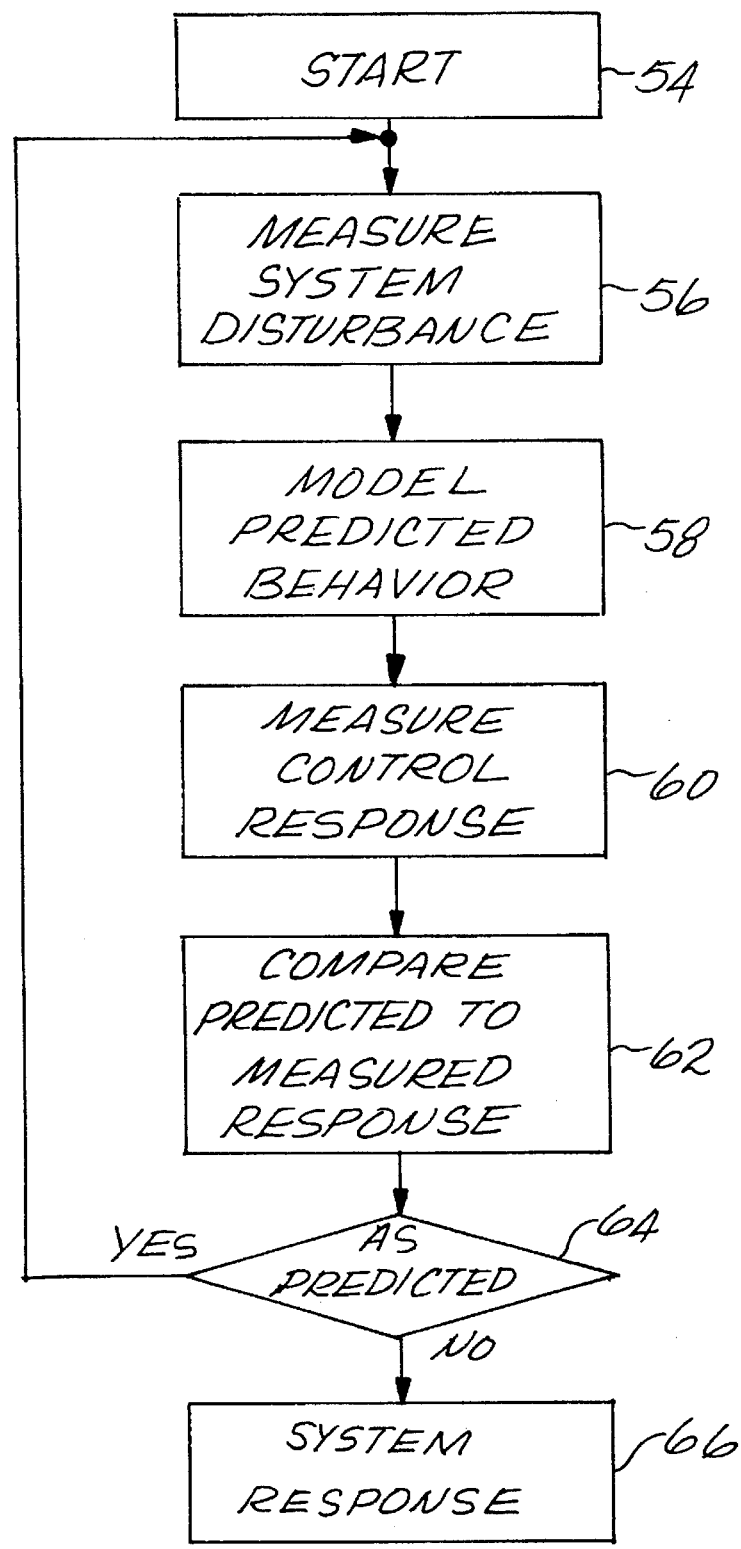
FIG. 5 is a flow chart for the automobile control system operation.

The drawings described above are more clearly understood based on the description of the following specification wherein the elements identified by numerical and alphabetic designators on the drawings comprise:

10 human-machine system generally
12 human operator
14 machine control system
16 actual performance feedback
18 control element
20 wheel motors
22 human operator higher level cognition
24 voluntary motor reaction
26 disturbance calculator
48 measurement and selection system
50 vehicle steering system
52 secondary signalling
Y actual system performance designator
R desired performance designator
J control response input
M maneuvering signal
D disturbance input

DETAILED DESCRIPTION

The general human machine system incorporates a human operator and a machine control system. The human operator provides control inputs to the machine control system, which are then interpreted to provide complete control for the system. The human operator employs sensory perception, directly or via instrumentation, to monitor the operation of the operator system to create the control inputs desired. The actual system performance is identified by. This actual performance creates a feedback in the system. The human operator through the use of neural processes compares the actual machine performance with a desired performance. The human then generates a control response to the machine control system. The present invention incorporates measurement of the human command response within the machine control system. A disturbance in the control loop affects the control response of the operator and the operator response is then monitored by the machine control system. This allows direct observation of the response of the user to disturbances or perturbations for information on how the user is currently performing the control task. Measurement of the combined response by the human operator to the disturbance is then used to adapt the machine control system. By observing disturbance correction behavior by the human operator, modeling can be accomplished for use in adapting the machine control system for various performance requirements, including inferring a system output desired by the operator.

The disturbance in the invention is applied at any portion of the feedback loop downstream from the human operator. Measurement by the machine control system of the control output of the human operator is measured anywhere downstream from the human and upstream from the disturbance. The machine control system analyzes the disturbance/reaction data for information about the control behavior of the human operator. Standard system identification techniques are employed to characterize the human control process by providing a model of the portion of the human control action that corrects for the disturbance. Applicable characterization methods include parametric and non-parametric system identification, as well as implicit and explicit neural network and Bayesian modeling techniques.

The disturbances present in the system can be applied by the system or naturally occurring disturbances imposed by external stimuli on the system or a combination of both.

Applied disturbances can be small enough not to be consciously perceived by the user. This level of disturbance creates perception and reaction which are performed as parts of a learned motor skill. The adaptive process of the present invention is therefore autonomous due to continuous observation of the human operator without requiring conscious attention or action. Further, the process of the present invention does not rely on the user to remember that adaptation must take place or to consciously act, thereby allowing faster and more reliable adaptation than manual adaptation by the human operator through switch activation or other means. Disturbances applied by the system are designed or calculated to be informative for the monitoring system in the machine control system.

Naturally occurring disturbances created by external stimuli or stochastic perturbations in the system which can be measured are used in the same way as applied disturbances. The monitoring system of the machine control system separately measures the disturbance and the combined control reaction by the human operator to the disturbance.

Prediction of response by the human operator to the disturbance is then made and a comparison conducted to the actual combined control response. The machine control system is then adapted based on comparison of actual and predicted behavior. Adaptation of the system based on the characteristics of the response of the human operator and other system variables is accomplished by various methods, including neural networks, Bayesian techniques, artificial intelligence, expert systems and fuzzy logic. The use of disturbances that are naturally present in the system allows the monitoring system to involve fewer components and operate without changing the behavior of the human operator in any fashion. A cost trade off is made between measurement of the naturally occurring disturbance and prediction of operator response to the calculation of applied disturbances. In addition, in certain operation scenarios where operator workload is high, application of additional disturbances to the system, even those of a minimally perceivable nature, may not be appropriate.

A first exemplary embodiment of the present invention is a motorized wheelchair control system employing the applied disturbance approach. Motorized wheelchairs typically provide handicapped individuals with limited autonomy by making them mobile. Certain multiply handicapped individuals cannot adequately control existing wheelchair systems due to their limited voluntary muscle control. Incorporation of the present invention into the control system for the motorized wheelchair allows the handicapped user to share control with the control system in the chair allowing them to achieve desirable motion while the chair control overrides unsafe maneuvers. An important characteristic of a human operator is the ability to adapt their control behavior to changes in environmental conditions and functional requirements. With the wheelchair example, control acuity in the human operator changes between an "open room" with no obstacles to passage through a hallway or door opening requiring greater lateral directional control. The wheelchair in which the present invention is incorporated employs a sonar system with automatic obstacle avoidance routines in the control system of the chair for primary control. Generalized guidance is provided by the human operator. The motorized chair incorporates a joystick which is operated by the human resulting in specific inputs to a joystick and control element. The joystick and control element provides a maneuvering signal to the wheel motors of the chair. Actual motion of the chair is implemented by the wheel motors. As previously described, the actual motion or path of the chair is represented by the output signal of the system. The human operator employs higher level cognition to compare the actual path of the chair to a desired path. This higher level cognition function creates a portion of the conscious control of the chair through voluntary motor reaction.

To assess the current needs of the chair operator, the system employs a disturbance calculator to create a change in the joystick zero offset applied to the system as a disturbance. An autoregressive recursive (ARX) system identification method is used to find a model of the human operator in real time based on the positioning of the joystick by the human operator which is the control signal. The ARX model predicts joystick behavior as a result of current disturbances (zero offset position of the joystick) and the difference between predicted and actual behavior can be used as a parameter of human performance for adaptive control of the wheelchair. In particular, the joystick and control system adapts the sensitivity of the joystick to meet current needs of the user such as selecting a "open room" mode for operation of the wheelchair in an open area or a "door passage" mode of operation in narrower confines where more precise lateral control is required. The program routine for computerized control of the wheelchair system chart is operated every 30 milliseconds in the present embodiment to allow real time adaptation and control of the system. After a start, at the beginning of the 30 millisecond window, the output of the joystick is read and a steer command created. The disturbance calculator computes a disturbance which is applied to the joystick by altering the zero offset. The disturbance must be unpredictable for optimum system performance, consequently, a random number generator is employed in creating the disturbance. The output of the joystick is received, which incorporates the operator's reaction to the disturbance and the desired steering information, and an ARX model of the user is computed.

For the present embodiment, a two-mode selection is the adaptation performed by the system. A measure of model quality is calculated using actual versus predicted joystick positioning with RMS error as the output parameter. A true/false test based on a threshold for RMS error is employed to test the quality measure. If the threshold is exceeded, the "open room" mode is selected and "open room" parameters are set for the control system. If the test quality measure block results in a false test wherein the RMS is less than the threshold value, the mode for door passage is selected and door passage parameters are set in control system. The parameters set by the mode are transmitted to the obstacle avoidance program which then performs obstacle avoidance based on the mode set. A return is then established awaiting the next 30 millisecond control period.

Annotated computer code in the C language performing the various functions identified in the basic flow chart is provided in Appendix 1. The main loop for the system entitled "update_drive" performs the basic functions described. The joystick position created by the human operator is read and, based on positioning of the joystick, the obstacle avoidance routine is performed with current parameters (obstacle_avoidance). Selection of an operation mode is then accomplished using the present invention (mode_observe). Initially, a disturbance is calculated (disturbance_test) and the disturbance is added to the joystick command. An ARX model is then computed with u=disturbance and y=joystick steer. The model is then used to predict user behavior by employing an IIR filter. The RMS error of the model, with exponential forgetting, is computed as a measure of current model quality. The mode is then determined for the system by a simple test wherein RMS is greater than or less than the threshold value and the parameters are then set for the mode which has been determined. The parameters are then provided to the obstacle avoidance routine and commands are sent to the motor for actual steering of the system.

As exemplary of the model employed in the system, an autoregressive model relating applied disturbance D to joystick position J is identified to each data set where subscript 0 corresponds to the current data sample, 1 to the most recent sample and so on. System identification evaluates the parameters $a_i$ and $b_i$ through least squares regression of observed data pairs D and J.

$$J_o = - \sum_{i=1}^{N_a} a_i J_i + \sum_{i=0}^{N_b} b_i D_{(i+N_k)} \qquad (1)$$

Subsequent human control behavior is analyzed by comparing actual and predicted joystick positioning. Predicted joystick behavior is calculated by using recorded values of D and the identified values of a and b in Equation 1. The difference between these values is smoothed using a 1.5 Hz lowpass IIR filter and the results are rectified and compared to threshold parameters. The analysis approach identified herein has been previously used as a method of measuring visual fatigue in "A New Quantitative Indicator of Visual Fatigue" published by Goussard Y., Martin, B., and Stark, L., *IEEE Transactions on Biomedical Engineering*, Vol. BME-34, No. 1, 1987.

A refinement of the wheelchair embodiment of the present invention is employed to allow close approach to obstacles, such as a desk or other structure normally avoided by the obstacle avoidance system of the wheelchair. Basic operation of the system is as described with regard to the "open room" and "door passage" control system modes, however, multiple ARX models (six in a tested embodiment) are maintained instead of a single model. Each ARX model corresponds to a different delay between disturbance and response, which in turn corresponds to a different $N_K$ in Equation (1). The six models span the range of normal human control to allow modeling of any operator using the system, as opposed to requiring individual modeling for the single ARX model of the prior system. The six ARX models employ $N_K$ of values 4 to 10 in integer values corresponding to 120 millisecond to 400 millisecond delay times for the model. The disturbance measured by the system is the difference between the joystick command and the output of the obstacle avoidance routine. In other words, the disturbance is the modification to the joystick command made by the obstacle avoidance program. If the wheelchair is operating in the "open room" mode and begins to approach a desk, the obstacle avoidance routine would provide signal direction to the wheel motor control to steer around the desk. Operator input on the joystick attempting to correct the avoidance input in order to approach the desk is sensed as the response to the disturbance created by the obstacle avoidance code.

In each control loop, all six models are updated and the quality of each model is calculated. The model having the best quality is used to perform the adaptation. A determination based on that model and a threshold value established for the "close approach" mode versus the "open room" mode provides a determination that the operator is making an effective and coherent attempt to override the obstacle avoidance system. The control system is then adapted to the close approach mode, allowing the operator to move close to the desk and the obstacle avoidance system of the chair is turned off.

In the present embodiment, the speed of the chair is employed as a secondary control parameter to return to the obstacle avoidance mode. If the operator provides control inputs to the chair which increase the velocity of the chair, the obstacle avoidance mode is reinitiated. Annotated computer code in the C-language performing the functions described for the close approach mode selection employing the present invention is provided Appendix 2.

As in the earlier-described embodiment, the main loop for the system is entitled "update_drive" and performs the same basic functions. The subroutine "mode_observe" is employed to determine a disturbance and observe the reaction for selecting an operating mode. In the code, two mode observance functions, "mode_observe1" and "mode_observe2" are provided The "mode_observe1" employs the difference between the change in joystick position based on the obstacle avoidance input as previously described and employs six ARX models for response of the human operator. The second mode observance routine, "mode_observe2" employs a calculated random disturbance implemented by the subroutine "disturbance_test" and a single ARX model for determination of the "close approach" versus "open room" modes similar to that previously described for the "open room" versus "door passage" modes previously described.

A second exemplary embodiment of the invention is incorporated in an automotive control application shown. The driver of a car will correct for lateral vehicle accelerations or directional changes that are unintentional, such as those due to crosswinds, bumps or uneven road surfaces. These motions can be monitored with lateral accelerometers placed at the cowl, transmission tunnel, on the floor under the driver's seat or at the firewall, as examples. Typical signals received by the accelerometers will have various amplitudes and frequencies representing the disturbances applied to the vehicle from the external sources. The measurement and selection system in the vehicle incorporates the accelerometer or other measurement device which receives as an input the disturbance signal. The disturbance signal is transmitted in the vehicle by a change in the directional path which is, in turn, sensed by the human driver as a change from the desired path using higher level cognitive function. The driver's reaction to the disturbance is provided to the vehicle as a control signal. In addition, the control signal is provided to the measurement and selection system. The measurement and selection system observes the data from the disturbances identifying the naturally occurring structure and comparing the human control signal for characterization of the response. After characterization of the response, the measurement and selection system provides one or more system outputs, for example, to modify the vehicle steering system, or provide secondary signaling.

Software implementation for the system is similar to that for the wheelchair system. As previously described with regard to the wheelchair system, a timed routine may be employed to accomplish the monitoring and control functions initiated by a start. The system measures disturbances induced by external stimuli, such as the lateral accelerations due to wind gusts in block. Predicted behavior is modeled based on the measured disturbance in block. The actual control reaction by the human operator is measured in block and a comparison of the predicted response to measured reaction is conducted by the system in block. The comparison of predicted response to measured reaction allows the determination whether the reaction was typical (as predicted) or abnormal as in block. If the reaction was as predicted, the system returns to the next timed period. Those skilled in the art will recognize that system initiation for the comparison may be accomplished by signal interrupts created by a sensed disturbance or other appropriate control approach. If the measured reaction is not as predicted, the system provides a predetermined response in block.

The system, as identified, is employed to determine the state or level of the human operator's function, e.g., is the human alert, drunk, asleep, distracted, or otherwise impaired. System response for inattention, whether the human is asleep, distracted, or otherwise nonreactive or shows subnormal response to disturbances to the system, is a light, verbal command or warning buzzer activated to alert the human operator. The present embodiment as described when implemented for a drunk driving alert system automatically engages the hazard warning lights or flashes the headlights in the vehicle to warn other drivers and attract police response. Currently available vehicle systems, such as radio/stereo systems or cellular phones are employed for generation of warning signals. Alternatively, for critical process systems such as ship steering, air traffic controllers, airline pilots, or plant process technicians, unacceptable or impaired response is identified by the system and the system response includes a warning or alert to a remote location, system shutdown, or initiation of an automatic control routine separate from the human operator.

Additional refinement of the present embodiment employs multiple cycle sensing wherein a first abnormal response is confirmed by identification of one or more subsequent disturbances to confirm the initial abnormal response prior to creating a system response, or alternatively, employing the initial abnormal response to induce a known disturbance in the system which is then employed for comparison to the operator response to confirm the abnormal behavior.

The present invention is employed with additional parameters in the control system or with multiple disturbance response circuits for detail level control. As exemplary of these multiple parameter embodiments, an automotive system employs a secondary parameter input of speed sensing to determine the assessment of proper control algorithm based on the disturbance, or alternatively, definition of the disturbance measurement itself. In slow speed operation, e.g., five miles per hour to fifteen miles per hour, an imposed disturbance is employed on steering correction to determine the sensitivity required by the steering system, resulting in a proper control algorithm. For example, slow speed operation in rush hour stop-and-go traffic would employ a first control algorithm with minimal steering sensitivity, while parking operations would employ increased steering sensitivity. At slow speeds, inputting a disturbance to the steering system would have minimal safety impact. At higher speeds, where inputting a disturbance to the steering wheel could impact safety, the system employs external stimuli on the steering system which are measured as the comparison for operator's response. This avoids inputting a disturbance which could create a potential safety hazard at high speed. Alternatively, the control on which the disturbance is inputted is changed at higher speed. For example, at low speeds, the input disturbance is applied to the steering control system, while at high speed, an input disturbance could be applied to the drive train of the vehicle, similar to the load imposed by engaging an air conditioning unit, to determine operator response with the accelerator pedal. This type of disturbance would create no safety impact beyond similar stimuli already present in an automotive system.

The capability of the invention to be used for multiple sensing points for disturbance and operator response, such as combined steering and throttle control, are employed in embodiments of the invention for further modeling refinement wherein one disturbance input and operator response measurement circuit may not provide sufficient information.

The present invention is applicable to numerous control systems and approaches. As identified for the embodiments presented herein, the invention may be employed for systems such as the motorized wheelchair or drunk driver sensing where volitional control of the operator is impaired. The system may also be employed where operator incompetence is created due to environmental effects such as high vibration environments. High vibration may impose sensory difficulties, such as blurred vision in extreme cases at relatively high frequencies or loss of muscle coordination for control inputs at low frequency/high amplitude vibration. In both cases, the present invention may be employed to monitor human control response based on a debilitating stimuli to adapt the control system, whether the direct control input response is secondarily affected, such as in the blurred vision case, or primarily affected, such as in the loss of coordination case.

Having now described the invention in detail, as required by the Patent Statutes, those skilled in the art will recognize modifications and substitutions to the embodiment disclosed for use of the invention in specific applications. Such modifications and substitutions are within the scope and intent of the invention as defined in the following claims.

David Bell: Sept 7, 1993.

This is copywrited material: NavChair Project, 1993

Routines that are used to perform mode selection in the NavChair
    using human disturbance modeling.

```c
//****************************************************************
//      UPDATE_DRIVE
//
//      This is the main drive command loop.  It reads the joystick,
//      applies transformations and sets the new motor command.
//
//**************************************************************** void update_drive( void)

{
    motor_flag = FALSE;                  // clear the trigger flag

EJ_joystick_prep();                  // read and prefilter joystick
    /* Don't use motor_count == 0 here, since putgrid() fills that */ if( motor_count == 1) {              // every 30msec:

get_nav_pos();                   //  update position of chair
        choose_input_command();          //  update joystick variables
        joy_targ_dir();                  //  set target direction if( obs_mode || hist_flag)       // time out of obstacle
            time_func( &hist_time,       // avoidance
                calc_hist);              // .
    } else if( motor_count == 2) { if( obs_mode)                    // apply obstacle avoidance
            time_func( &oa_time,         // and time it.
                obstacle_avoidance);     // .

mode_observe();                  // select a mode

EJ_command_prep();               //  every 30msec take_test_data();                // observe data for testing
    }

EJ_motor_prep();                     // smooth motor command return;
}

//****************************************************************
// OBSTACLE_AVOIDANCE
//
//      This function calculates a motor command based upon the sonar
```

APPENDIX 1

```
//      readings to avoid obstacles.
//
//***************************************************************** void obstacle_avoidance( void)

{
    static int trap = FALSE;           // used to detect trap condition scale_maxspeed();                  // calculate new obs.maxspeed if( min_obs_mode && !min_calc_free_dir())        // calculate
free direction
        trap = TRUE;                                 // detect trap
condition else if(!min_obs_mode && !thresh_calc_free_dir())   // calculate
free direction
        trap = TRUE;                                 // detect trap
condition if( frcpls_flag) {                 // modify free direction based
on
        time_func( &hist_time,         //  .
            calc_force);               // calculate force vector
        time_func( &hist_time,
            force_plus);               //    force information
    } if( cls_mode)                      // Experimental close obstalce
avoidance mode
        close_oa();

steer_direction();                 // generate new motor command from
free dir and reduce speed based on repulse if( trap) {                        // detect trap -- currently
        trap = FALSE;                  // we don't do anything with
        jsound( 0);                    // this: it is handled
elsewhere
    }
}

/
//*****************************************************************
//  DISTURBANCE_TEST -- Mar 22, 1993
//
//      Calculate and apply a "random" disturbance to the joystick.
//      The disturbance has non-uniform distribution to increase
//      the information content for system identification: it is
//      restricted to jump between positive and negative values to
//      insure that the difference between successive values is
//      greater than a minimum.
//
//***************************************************************** void disturbance_test( void)
{
```

```
    static int cut = 0;
    static int cnt = 1;
    static float old_sign = 1.0;

cnt++;

if( !dist_flag) return;                          // if disturbance mode if( cnt > cut)                                   // timer alarm:
    {                                                //   .
        disturbance = old_sign * obs.h_min           // recalculate disturbance
                    * (0.6 + 0.4 * frand());         //   .
        old_sign = - old_sign;                       //   .
        cnt = 0;                                     // reset timer
        cut = (int)( frand() * 12.0 + 4.0) * 2;
    }
}

//*****************************************************************
// MODE_OBSERVE -- DB -- Mar 25, 1993
//
//      Applies a disturbance to the joystick, observes the reaction
//      and selects an operating mode.
//
//***************************************************************** typedef struct io_data_struct
{
    int k;                                  // time position from current
    float y;                                // output
    float fy;                               // filtered (predicted) output
    float u;                                // input
    struct io_data_struct *next;            // pointer to next entry in
linked list
} IO_TYPE;

typedef IO_TYPE *IO_PTR;                    // define data type as a
pointer to io data extern float *P, *T, *AB;
extern float lam;
extern int na, nb, nk, ns;
extern float disturbance;

float err_thresh = 300;

#define DOOR  1
define OPEN  2 void mode_observe( void)
{
    int init = TRUE;                        // initilization flag
    IO_PTR new_data, cur_data;
    static int low_cnt = 0;                 // count successive TRUEs
    float cur_error;
```

```
    static float cum_error = 0.0;         // cumulative RMS error disturbance_test();                   // calculate disturbance if( init)                             // initialize the first time
    {                                     // set the end of the linked
        cur_data = NULL;                  //   to NULL
        init = FALSE;                     //   .
    } new_data = alloc_io();                // add new data to linked list
    new_data->u = disturbance;            //   input to human
    joy_steer += disturbance;             //   apply disturbance to
joystick
    new_data->y = joy_steer;              //   output from human
    new_data->next = cur_data;            //   construct list
    cur_data = new_data;                  //   . (the end is erased in
rarx)

rarx( cur_data, &P, &T, na, nb, nk, ns, lam);    // calculate model
    iir_filt( cur_data, &AB, na, nb, nk, ns, FALSE); // predict data cur_error = cur_data->fy - cur_data->y;   // calculate RMS predicted
(fy)
    cum_error = sqrt( sqr( cur_error)     // minus actual data (y)
                    + sqr( cum_error));   //   .

if( cur_error < err_thresh)           // mode selection test
    {                                     //   door passage condition:
        low_cnt++;                        //     predicted and observed
        if( low_cnt > 10)                 //     have a good fit for ten
            mode_flag = DOOR;             //     consecutive periods.
    }
    else                                  //   condition for open room:
    {                                     //   bad fit for one period.
        low_cnt = 0;                      //     .
        mode_flag = OPEN;                 //     .
    }                                     //     .

cum_error *= 0.98;                    // exponential forgetting if( mode_flag = DOOR)                 // if in door-passage mode
    {                                     //   .
        obs.w_max = 0.0;                  //   turn force_plus off
        frcpls_flag = FALSE;              //   .
        obs.d_weight2 = 20;               //   reduce wheelchair autonomy
        obs.lim_maxspeed = 1000;          //   reduce speed
    }
    else                                  // if open room mode
    {                                     //   .
        obs.w_max = 0.35;                 //   turn force_plus on to
        frcpls_flag = 5;                  //       five-point operation
        obs.d_weight2 = 5;                //   more wheelchair autonomy
        obs.lim_maxspeed = 1200;          //   increase max speed
    } return;
}
```

```c
/*********************************************************************
****
  Motor and steer control for chair.c */ include "chair.h"
include "\navchair\navchair.h"
#include "navproto.h"
#include "navext.h"
#include "math.h"
#include "bgi.h"
pragma hdrstop include "grid.h"
include "limits.h"
#include "stdlib.h"

#include "sonar.h"

char *ddata;

void mode_observe1( void);
void mode_observe2( void);

void disturbance_test( void);
float disturbance;

//****************************************************************
// Macro definitions
//****************************************************************

/*********************************************************************
  Local and experimental variables. */

/* free_dir noise */ float old_free_dir, cum_free_noise, max_free_noise;
float old_free2_dir, cum_free2_noise, max_free2_noise;
float old_free3_dir, cum_free3_noise, max_free3_noise;
float old_targ_dir, cum_targ_noise, max_targ_noise;
float old_mag, cum_mag_noise, max_mag_noise;
float old_mag2, cum_mag2_noise, max_mag2_noise;

float test_teta;

//****************************************************************
//     UPDATE_DRIVE
//
//     This is the main drive command loop.  It reads the joystick, applies
//     all kinds of transformations and sets the new motor command.
//
//**************************************************************** void update_drive( void)
```

```
{
    motor_flag = FALSE;                  // clear the trigger flag

EJ_joystick_prep();                  // read and prefilter joystick if( motor_count == 1) {              // every 30msec:
        get_nav_pos();                   //   update position of chair
        choose_input_command();          //   update joystick variables for OA
        joy_targ_dir();                  //   set target direction if( obs_mode || hist_flag)       //   take this time out of obstacle
            time_func( &hist_time,       //   avoidance to
                calc_hist);              //   calculate polar histogram
    }
    else if( motor_count == 2) { if( obs_mode)                    // apply obstacle avoidance
            time_func( &oa_time,         //   and time it. This provides
                obstacle_avoidance);     //   an alternate joy_for -> for.

if( rec_test_data) rec_test();   // record test data mode_observe();                  // select a mode EJ_command_prep();               //  every 30msec use new oa command take_test_data();                // observe data for testing
    }

EJ_motor_prep();                     // smooth and interpolate to 10msec return;
}

//****************************************************************
// OBSTACLE_AVOIDANCE
//
//     This function calculates a motor command based upon the sonar
//     readings to avoid obstacles.
//
//**************************************************************** void obstacle_avoidance( void)

{
    scale_maxspeed();                    // calculate new obs.maxspeed if( min_obs_mode)                    // calculate free direction
        min_calc_free_dir();             //   using the min method
    else if( min_obs_mode == FALSE)      //   or the threshold method
        thresh_calc_free_dir();          //   .
    else free_dir = targ_dir;            //   or just use the target direction if( frcpls_flag){                    // perform force calculations
        time_func( &hist_time,           //   .
```

```
                calc_force);                  // calculate force vector
         time_func( &hist_time,               //    .
                force_plus);                  //    modify free_dir using force
vector
      } if( cls_mode)                              // perform collision avoidance
      close_oa();                             //    .

steer_direction();                         // generate new motor command from
                                              //    free dir and reduce speed based
                                              //    on repulse
}

//*************************************************************
// DISTURBANCE_TEST -- Jan 22, 1993
//
//      Calculate a "random" disturbance to the joystick.
//      The disturbance has non-uniform distribution to increase
//      the information content for system identification: it is
//      restricted to jump between positive and negative values to
//      insure that the difference between successive values is
//      greater than a minimum.
//
//************************************************************* void disturbance_test( void)
{
   static int cut = 0;
   static int cnt = 1;
   static float old_sign = 1.0;

cnt++;

if( !dist_flag) return;                    // if disturbance mode is on if( cnt > cut)                             // if the timer has expired:
   {                                          //    .
      disturbance = old_sign * obs.h_min      // recalculate disturbance
              * (0.6 + 0.4 * frand());        //    .
      old_sign = - old_sign;                  //    .
      cnt = 0;                                // reset timer
      cut = (int)( frand() * 12.0 + 4.0) * 2;
   }
}

//*************************************************************
// MODE_OBSERVE
//
//      Applies a disturbance to the joystick, observes the reaction
//      and selects an operating mode.
//
//      observes variables relevant to mode selection and makes
//      a guess at the desired mode.
//
```

```c
//*****************************************************************
float highf[] = { 0.2569, -0.7707, 0.7707, -0.2569, -0.5772, 0.4218,
-0.0563};
float highm[] = { 0.5276, -1.5829, 1.5829, -0.5276, -1.7600, 1.1829,
-0.2781};

#define CLOSE_APP 1
define OPEN_ROOM 2 void mode_observe1( void)
{
   int          i;              // loop variable
   int          max_i;
   static float    mode_ind2;              // mode index
   static float    maxd;
   static float    dsu[ 15], dsy[15];
   static float    jsu[ 15], jsy[15];
   static float    jpy[ 15];
   static int   i_cnt[10];
   static float m;
   float temp;
   static int cur_mode = CLOSE_APP;

if( !auto_mode_flag) return;        // if auto mode is not on -- exit dsu[ 0] = steer - joy_steer;        // disturbance is the change in
   iir_filt( highm, dsu, dsy, 3, 3, 0);//   joystick command made by the
   jsu[ 0] = joy_steer;                //   obstacle avoidance code, high
   iir_filt( highm, jsu, jsy, 3, 3, 0);//   pass filtered.

max = 0;
   for(i=4; i<=10; i++)
   {
      rarx( &T+i*30, &dsy, &jsy, na, nb, i);   // update ith model
      iirfilt( &T+i*30, &dsy, &jpy, na, nb, i); // predict
      temp = sqr(jpy[i] - dsy[0]) / 20000.0;   // measure fit
      if( temp > m) {                          // find best fit
         m = temp;
         max_i = i;
      }
   } mode_ind2 = m * closect.ms2;          // human mode index
   if( mode_ind2 > 10) mode_ind2 = 10;   //  .

motor_mag = sqrt( sqr( (float) forward)
               + sqr( (float) steer * TURN_CENTER / 1000.0));
   joy_mag = sqrt( sqr( (float) joy_forward)
               + sqr( (float) joy_steer * TURN_CENTER / 1000.0));

if( cur_mode == CLOSE_APP && motor_mag > obs.lim_maxspeed)
      cur_mode = OPEN_ROOM;
   else if (cur_mode == OPEN_room && mode_ind2 > 10)
      cur_mode = CLOSE_APP;

if( cur_mode == CLOSE_APP)           // if in close mode
   {
```

```
        setcolor( WHITE);
        obs.w_max = 0.0;              // turn force_plus off
        frcpls_flag = TRUE;           // .
        obs.d_weight2 = 30;           // decrease wheelchair autonomy
        obs.segs = 6;
        obs.lim_maxspeed = 800;       // set speed low
    }
    else
    {
        setcolor( YELLOW);
        obs.w_max = 0.35;             // turn force_plus off
        frcpls_flag = TRUE;           // .
        obs.d_weight2 = 5;            // decrease wheelchair autonomy
        obs.segs = 14;
        obs.lim_maxspeed = 1000;      // set speed high
    } return;
} void mode_observe2( void)
{
    int          i;                   // loop variable
    int          max_i;
    static float mode_ind;            // mode index
    static float maxd;
    static float dsu[ 15], dsy[15];
    static float jsu[ 15], jsy[15];
    static float jpy[ 15];
    static int   i_cnt[10];
    static float m;
    float        temp;
    static int cur_mode = CLOSE_APP;

if( !auto_mode_flag) return;      // if auto mode is not on -- exit disturbance_test();
    dsy[ 0] = disturbance;            // record disturbance
    jsy[ 0] = joy_steer;              // record human response rarx( &T, &dsy, &jsy, 3, 3, 6);// update human model
    iirfilt( &T, &dsy, &jpy, 3, 3, 6);  // predict
    jsu[ 0] = sqrt( 0.98 * sqr( jsu[1]) + sqr(jpy[6] - dsy[0]));   // RMS
    iirfilt( &low1, &jsu, &dsu, 3, 3, 0);  // low-pass filter
    mode_ind = fabs( dsu[0]);         // rectify if( cur_mode == CLOSE_APP && motor_mag > obs.lim_maxspeed)
        cur_mode = OPEN_ROOM;
    else if (cur_mode == OPEN_room && mode_ind2 > closect.ms2)
        cur_mode = CLOSE_APP;

if( cur_mode == CLOSE_APP)        // if in close mode
    {
        setcolor( WHITE);
        obs.w_max = 0.0;              // turn force_plus off
        frcpls_flag = TRUE;           // .
```

```c
        obs.d_weight2 = 30;             // decrease wheelchair autonomy
        obs.segs = 6;
        obs.lim_maxspeed = 800;         // set speed low
    }
    else
    {
        setcolor( YELLOW);
        obs.w_max = 0.35;               // turn force_plus off
        frcpls_flag = TRUE;             // .
        obs.d_weight2 = 5;              // decrease wheelchair autonomy
        obs.segs = 14;
        obs.lim_maxspeed = 1000;        // set speed high
    } return;
}

//****************************************************************
// IIR_FILT -- DB -- Sept. 12, 1993
//
//      Perform iir filtering.
//
//      iir[ ..] = (a[ na], b[ nb]);
//      in[ ..]  = input values(zero equals most recent)
//      out[ ..] = output values (zero equals *past* most recent --
//                 this routine will increment the contents and
//                 put the *new* most recent in the first spot (0))
//      nk = delay, in time steps
//
//**************************************************************** void iir_filt( float *iir, float *in, float *out, int na, int nb, int
nk)
{
    int i;                              // loop variable
    float y = 0.0;                      // new output value for( i=0; i<=na; i++)               // compute new output
        y += iir[ i] * in[ i+nk];       // .
    for( i=1; i<=nb; i++)               // .
        y -= iir[ na+i] * out[ i];      // note sign here -- standard
                                        //    definition of b in MATLAB out[ 0] = y;                        // .
    for(i=9; i>=1; i--) {               // increment output values
        in [ i] = in [ i-1];            // .
        out[ i] = out[ i-1];            // .
    }                                   // .
}

//*****************  end of file: NAV-CA.c  *******************
```

What is claimed is:

1. An adaptive control method for human in the loop systems comprising the steps of:
   (a) sensing human operator reaction to a disturbance in a control system;
   (b) characterizing an operator response to the disturbance;
   (c) comparing the operator reaction and the characterized response to produce a result;
   (d) modifying an initial control law based on the result of the comparison to create a modified control law; and
   (e) creating a control signal based on the modified control law.

2. A method as defined in claim 1, further comprising of the initial steps of:
   (a) calculating a disturbance to be applied to the system; and
   (b) applying the calculated disturbance to the system wherein the disturbance of the sensing step comprises the calculated disturbance.

3. A method as defined in claim 1, further comprising the initial step of measuring a disturbance in the system created by external stimulus, and wherein the disturbance of the sensing step comprises the measured disturbance.

4. A method as defined in claim 1, further comprising the initial step of measuring a disturbance in the system created by stochastic perturbation in the system, and wherein the disturbance of the sensing step comprises the measured disturbance.

5. An adaptive control method for human in the loop systems comprising the steps of:
   (a) sensing human operator reaction to a disturbance in a control system;
   (b) characterizing an operator response to the disturbance;
   (c) comparing the operator reaction and the characterized response to produce a result;
   (d) quantifying the comparison into at least two categories;
   (e) identifying the category into which the result of the comparison falls;
   (f) selecting a control law based on the category identified; and
   (g) issuing control commands to the system using the selected control law.

6. A method as defined in claim 1, wherein characterizing an operator response to the disturbance comprises the steps of:
   (a) measuring the response;
   (b) storing the measurement in a database;
   (c) acting on the database with an artificial intelligence system; and
   (d) providing an output from the artificial intelligence system which characterizes the response.

7. A method as defined in claim 1, wherein characterizing an operator response to the disturbance comprises:
   (a) preparing a model of human response characteristics based on an initial control law;
   (b) predicting human operator response to the disturbance using the initial control law; and wherein the characterized response comprises the predicted response.

8. A method as defined in claim 1, wherein characterizing an operator response employs a neural network.

9. A method as defined in claim 1, wherein the step of creating a control signal employs Bayesian modeling techniques.

10. An adaptive control method for a motorized wheelchair having a joystick control input and motorized wheel control comprising the steps of:
    (a) applying a disturbance to the joystick;
    (b) sensing human operator reaction to the disturbance applied;
    (c) characterizing operator response to the disturbance;
    (d) comparing the operator reaction and the characterized response to produce a result; and
    (e) selecting a wheelchair operating mode based on the result of the comparison.

11. An adaptive control method for a motorized wheelchair having a joystick control input and motorized wheel control comprising the steps of:
    (a) applying a disturbance to the motorized wheel control;
    (b) sensing human operator reaction to the disturbance applied;
    (c) characterizing operator response to the disturbance;
    (d) comparing the operator reaction and the characterized response to produce a result; and
    (e) selecting a wheelchair operating mode based on the result of the comparison.

12. A operator impairment testing method comprising the steps of:
    (a) measuring a disturbance to a control system operated by the operator in an vehicle;
    (b) sensing operator reaction to the disturbance;
    (c) characterizing an operator response to the disturbance;
    (d) comparing the operator's reaction and the characterized response to identify a reaction inconsistent with the characterized response; and
    (e) activating an output when an abnormal reaction is detected.

13. An adaptive control method for a vehicle having a manual control input device and motorized wheel control comprising the steps of:
    (a) applying a disturbance to the manual control input device;
    (b) sensing human operator reaction to the disturbance applied;
    (c) characterizing operator response to the disturbance;
    (d) comparing the operator reaction and the characterized response to produce a result; and
    (e) selecting a vehicle operating mode based on the result of the comparison.

14. An adaptive control method for a vehicle having a manual control input device and motorized wheel control comprising the steps of:
    (a) applying a disturbance to the motorized wheel control;
    (b) sensing human operator reaction to the disturbance applied;
    (c) characterizing operator response to the disturbance;
    (d) comparing the operator reaction and the characterized response to produce a result; and
    (e) selecting a vehicle operating mode based on the result of the comparison.

* * * * *

UNITED STATES PATENT AND TRADEMARK OFFICE
CERTIFICATE OF CORRECTION

PATENT NO. : 5,555,495
DATED : September 10, 1996
INVENTOR(S) : David A. Bell; Lon E. Bell; Simon Levine; Yoram Koren It is certified that error appears in the above-indentified patent and that said Letters Patent is hereby corrected as shown below:

```
Column 1, line 8, change "is-drawn" to -- is drawn --.
Column 3, line 17, before "actual" delete "an".
Column 3, line 18, between the paragraph ending with
          "comparison." and the paragraph beginning
with "FIG. 1" insert the heading
          -- BRIEF DESCRIPTION OF THE DRAWINGS --.
Column 3, line 22, change "wheel chair" to
          -- wheelchair --.
Column 3, lines 65-66, after "performance" delete "is
          identified by. This actual performance".
Column 5, line 61, before "is" delete "chart".
Column 6, line 63, after "Goussard" insert a comma.
Column 7, line 1, change "structure" to
          -- structures --.
Column 7, line 45, before "Appendix" insert -- in --.
Column 7, line 52, after "provided" insert a period.
Column 7, line 64, after "application" delete "shown".
Column 8, lines 28,29,30,32, delete "in block" (all
          occurrences).
Column 8, line 35, after "abnormal" delete "as".
Column 8, line 35, after "as" delete "in block".
Column 8, line 41, after "response" delete "in block".
```

UNITED STATES PATENT AND TRADEMARK OFFICE
CERTIFICATE OF CORRECTION

PATENT NO. : 5,555,495
DATED : September 10, 1996
INVENTOR(S) : David A. Bell; Lon E. Bell; Simon Levine; Yoram Koren It is certified that error appears in the above-indentified patent and that said Letters Patent is hereby corrected as shown below:

```
Column 31, line 14, after "comprising" delete "of".
Column 32, line 27, before "operator" change "a" to
           -- an --.
Column 32, line 30, before "vehicle" change "an" to
           -- a --.
```

Signed and Sealed this

Eighth Day of April, 1997

Attest:

BRUCE LEHMAN

Attesting Officer      Commissioner of Patents and Trademarks